United States Patent
Novosolov et al.

(10) Patent No.: US 10,168,729 B1
(45) Date of Patent: Jan. 1, 2019

(54) APPARATUS AND SYSTEM FOR TEACHING CALCULATION SKILLS

(71) Applicants: Iurii Oleksandrovych Novosolov, Dnipro (UA); Oleksandr Novosolov, Dnipro (UA)

(72) Inventors: Iurii Oleksandrovych Novosolov, Dnipro (UA); Oleksandr Novosolov, Dnipro (UA)

(73) Assignee: Iurii Oleksandrovych Novosolov, Dnipro (UA)

(*) Notice: Subject to any disclaimer, the term of this patent is extended or adjusted under 35 U.S.C. 154(b) by 0 days.

(21) Appl. No.: 15/821,792

(22) Filed: Nov. 23, 2017

(51) Int. Cl.
G06C 1/00 (2006.01)
G09B 19/02 (2006.01)
G09B 5/02 (2006.01)

(52) U.S. Cl.
CPC .............. G06C 1/00 (2013.01); G09B 5/02 (2013.01); G09B 19/025 (2013.01)

(58) Field of Classification Search
CPC ........... G06C 1/00; G09B 5/02; G09B 19/025
See application file for complete search history.

(56) References Cited

U.S. PATENT DOCUMENTS 6,712,614 B1 * 3/2004 Henderson ............ B60R 21/207 434/202
6,801,751 B1 * 10/2004 Wood ..................... G09B 7/02 434/322
8,672,683 B2 * 3/2014 Long ...................... G06F 3/011 434/191
2002/0197589 A1 * 12/2002 Wood .................... G09B 19/02 434/201
2003/0036045 A1 * 2/2003 Vivian .................... G09B 5/00 434/350
2003/0087219 A1 * 5/2003 Berger .................... G09B 5/00 434/118
2005/0130106 A1 * 6/2005 Ho ......................... G09B 5/14 434/201
2008/0096169 A1 * 4/2008 Kim ...................... G09B 19/02 434/159
2011/0217688 A1 * 9/2011 Neher ................... G09B 25/00 434/365

FOREIGN PATENT DOCUMENTS

WO   WO 2013121432 A1 *  8/2013 ............. G09B 19/02

* cited by examiner

Primary Examiner — Eddy Saint-Vil
(74) Attorney, Agent, or Firm — Georgiy L. Khayet

(57) ABSTRACT

Provided is an apparatus for teaching calculation skills. The apparatus may include a plurality of beads and a set of columns of the cells being configured to be occupied by one of the beads. The apparatus may include a set of sensors configured to determine occupation of the cells by the beads, and a processing unit electronically coupled to the set of sensors. The processing unit can be configured to: receive from a server at least one array of integer numbers. Each of the integer numbers represents an intermediate result of solving of a sequence of mathematical operations displayed to a user; determine, via the set of sensors, occupation of the cells by the beads; translate the occupation of cells to a check number; and compare the check number to a current number in array to determine whether the current operation is solved correctly.

16 Claims, 9 Drawing Sheets

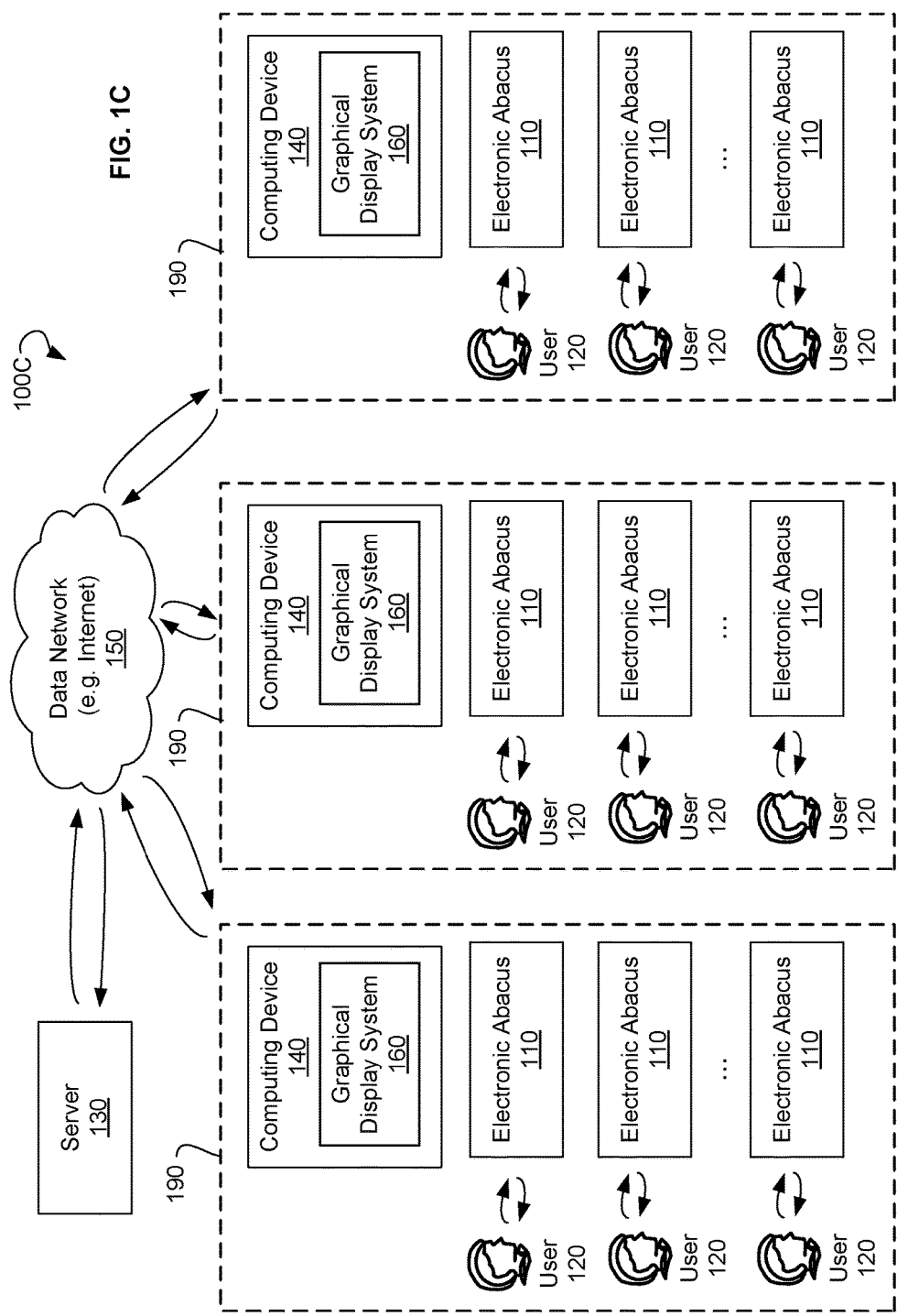

APPARATUS AND SYSTEM FOR TEACHING CALCULATION SKILLS

TECHNICAL FIELD

This application relates generally to the field of mathematical training devices and more particularly to a system for teaching calculations skills using an electronic abacus.

BACKGROUND

The embodiments described in this section could be pursued but are not necessarily embodiments that have previously been conceived or pursued. Therefore, unless otherwise indicated, it should not be assumed that any of the embodiments described in this section qualify as prior art merely by virtue of their inclusion in this section.

An abacus is known as a mechanical computing device, which is used to perform basic numerical calculation of addition, subtraction, multiplication, and division. Different types of abacuses have been used for calculations for many centuries. Despite development in electronic calculators and computers, some abacuses (for example, the Japanese soroban), are still in wide use in some countries. Abacuses can be also used as a tool for teaching and developing calculation skills in children and adults, especially mental calculation skills. Students can be first taught to use an abacus to perform arithmetical calculations. Then the students can be trained to imagine the abacus and mentally manipulate images of the abacus to perform the arithmetical calculations.

Some existing systems for teaching calculation skills using an abacus include electric or electronic abacuses connected to a computer for checking the results of calculations. Other known systems for training include online applications that may simulate calculations using an abacus.

The existing abacus based training systems have some disadvantages related to solving a mathematical problem with multiple operations. One of the disadvantages is the difficulty of determining the exact operation or step at which a mistake is made while performing multiple operations. Another disadvantage, entailed by the first one, is that when the student makes a mistake in at least one of the multiple operations of low level complexity, he/she may arrive at an operation that requires knowledge of an operation of a high level of complexity. Yet another disadvantage is that the existing training systems are not suitable to be used in group training because they do not allow to provide mathematical problems to the students with different skills.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is directed to a system for teaching skills of mental calculations using an electronic abacus. According to one embodiment of the present disclosure, an apparatus for teaching calculation skills is provided. The apparatus may include a plurality of beads. The apparatus may further include a set of columns. Each of the columns can include a predetermined number of cells. Each of the cells can be configured to be occupied by one of the beads. The apparatus may include a communication unit for communicating with a server. The apparatus may further include a set of sensors configured to determine occupations of the cells by the beads. The apparatus may further include a processing unit electronically coupled to the set of sensors. The processing unit may be configured to receive, from the server, via the communication unit, at least one array of integer numbers. Each of the integer numbers may represent an intermediate result of solving of a sequence of mathematical operations. The sequence of mathematical operations can be displayed to a user.

For each current number of the at least one array of integer numbers, the processing unit can be further configured to wait a pre-determined time to allow a user to move the beads to solve a current operation from the sequence of mathematical operations. The processing unit can be further configured to determine, via the set of sensors, whether cells are occupied by the beads. The processing unit can be further configured to translate the occupied cells into a check number. The processing unit can be further configured to compare the check number to the current number to determine whether the current operation is solved correctly.

In some embodiments, the sensors are infrared detectors, with each of the infrared detectors being located within one of the cells. In some embodiments, the communication unit is a wireless communication unit. In some embodiments, the beads are made from a semitransparent material. In some embodiments, the apparatus may further include a set of light source units communicatively coupled to the processing unit, with each of the light source units locating within one of the cells. In certain embodiments, the light source units are light-emitting diodes.

In certain embodiments, the processing unit can be further configured to determine, based on the check number and the current number, that a first subset of the cells is incorrectly occupied by the beads. The processing unit can be further configured to light the light source units corresponding to the first subset of the cells by a color (for example, by a red color).

In some embodiments, the processing unit can be further configured to determine, based on the current number, that a second subset of the cells is to be occupied by the beads to obtain the current number. The processing unit can be further configured to light the light source units corresponding to the second subset of columns by a color (for example, by a green color).

In some embodiments, the processing unit is further configured to receive, via the communication unit, the pre-determined time from the server.

According to another embodiment of the present disclosure, a system for teaching calculation skills is provided. The system may include a server configured at least to store a set of mathematical problems. The system may include at least one electronic abacus for solving the mathematical problems. The at least one electronic abacus may include a plurality of beads and a set of columns, with each of the columns including a predetermined number of cells. Each of the cells can be configured to be occupied by one of the beads. The at least one electronic abacus may further include a communication unit for communicating with the server via a data network. The at least one electronic abacus may further include a set of sensors configured to determine whether the cells are occupied by the beads. The at least one electronic abacus may further include a processing unit electronically coupled to the set of sensors and the set of light source units. The processing unit can be configured to receive, via the communication unit from the server, at least one array of integer numbers. Each of the integer numbers may represent an intermediate result of solving of a sequence of mathematical operations. The sequence of the mathematical operations may represent one of the mathematical problems. The sequence of mathematical operations can be displayed to a user.

For each current number of the at least one array of integer numbers, the processing unit can be further configured to wait for a pre-determined time to allow a user to move the beads to solve a current operation from the sequence of mathematical operations. The processing unit can be configured to determine, via the set of sensors, occupation of the cells by the beads. The processing unit can be configured to translate the occupation of cells into a check number. The processing unit can be configured to compare the check number to the current number to determine whether the current operation is solved correctly.

The system may further include a computing device. The computing device may include at least a graphical display system and a device communication unit for communicating with the server via the data network. The computing device can be configured to receive, via the device communication unit, the sequence of the mathematical operations representing one of the mathematical problems. The computing device can be configured to display, via the graphical display system, the sequence of the mathematical operations.

In some embodiments, the at least one electronic abacus further may include a set of light source units communicatively coupled to the processing unit. Each of the light source units can be located within one of the cells.

In some embodiments, the processing unit can be further configured to determine, based on the check number and the current number, that a first subset of the cells is incorrectly occupied by the beads. The processing unit can be further configured to light the light source units corresponding to the first subset of the cells by a color.

In some embodiments, the processing unit can be further configured to determine, based on the check number and the current number, a second subset of the cells is to be occupied by the beads to obtain the current number. The processing unit can be further configured to light the light source units corresponding to the second subset of columns by a color.

In some embodiments, prior to receiving at least one array of integer numbers, the processing unit can be further configured to send, via the communication unit, a registration message to the server, with the registration message including at least an identifier of the at least one electronic abacus. The processing unit can be further configured to synchronize, via the communication unit, a time associated with the at least one electronic abacus with a time of the server. In some embodiments, the computing device can be configured to send, via a device communication channel, a further registration message to the server. The computing device can be further configured to synchronize, via the device communication unit, a time associated with the computing device with the time of the server.

In some embodiments, the processing unit can be further configured to track and store errors and times of solving of a sequence of mathematical operations. The processing unit can be further configured to send, via the communication unit, the errors and times of solving of the at least one of the mathematical problems to the server.

Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

FIG. 1C shows an environment within which a system for teaching of calculation skills using an electronic abacus can be implemented, according to yet another example embodiment.

DETAILED DESCRIPTION

Figure 1A:
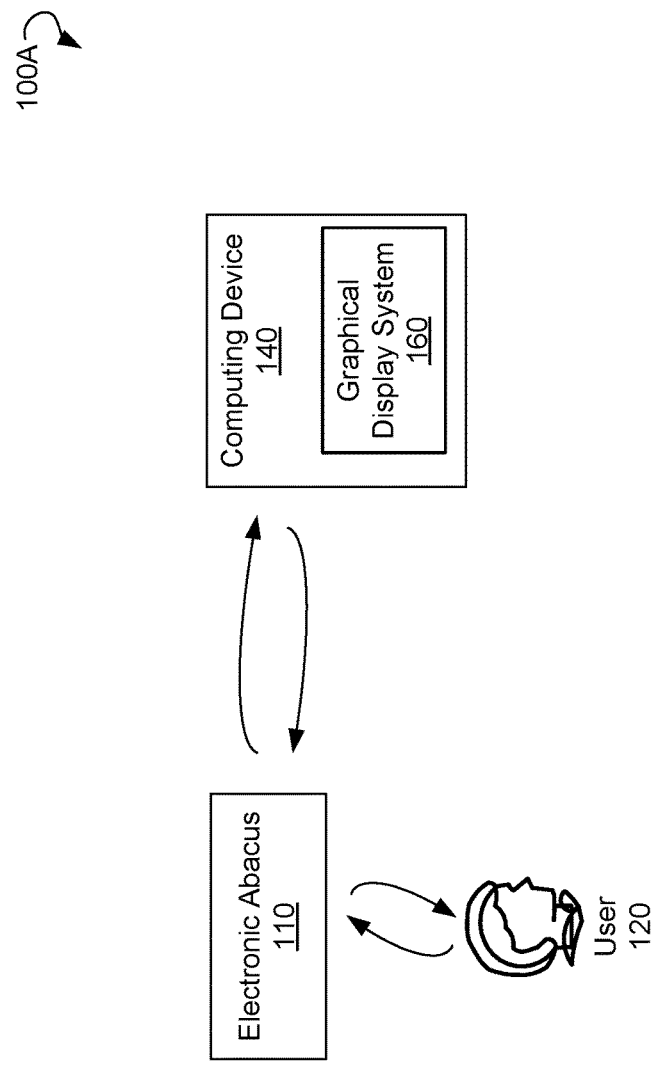
FIG. 1A shows an environment within which a system for teaching of calculation skills using an electronic abacus can be implemented, according to one example embodiment

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. It should be noted that methods disclosed herein can be implemented partially by a computer (e.g., a desktop computer, a tablet computer, a laptop computer), a cellular phone, a smart phone, a smart television system, and so forth.

Embodiments of the present disclosure are directed to mathematical training. An apparatus and a system for teaching calculation skills as described herein may be a tool for developing skills of mental calculation of children and adults. More specifically, the system may help students to perform arithmetical operations using an electronic abacus. The system may further facilitate education of students in groups while adjusting training exercises to each individual student based on skills of the student.

An example system for training of calculation skills may include a server and at least one electronic abacus. The server can be configured at least to store a set of mathematical problems. The at least one electronic abacus may include a plurality of beads and a set of columns. Each of the columns may include a predetermined number of cells. Each of the cells can be configured to be occupied by one of the beads. The at least one electronic abacus may further include a communication unit for communicating with the server. The at least one electronic abacus may further include a set of sensors configured to determine occupation of the cells by the beads. The at least one electronic abacus may further include a processing unit electronically coupled to the set of sensors. The processing unit can be configured to receive, via the communication unit from the server, at least one array of integer numbers, with each of the integer numbers representing an intermediate result of solving of a sequence of mathematical operations. The sequence of mathematical operations can be displayed to a user. For each current number of the at least one array of integer numbers, the processing unit can be configured to wait for the time interval to allow the user to move the beads to solve a current operation from the sequence of mathematical operations. The processing unit can be further configured to determine, via the set of sensors, occupations of the cells by the beads. The processing unit can be further configured to translate the occupation of cells to a check number. The processing unit can be configured to compare the check number and the current number to determine whether the current operation is solved correctly.

Referring now to the drawings, FIG. 1A illustrates an environment 100A within which a system for teaching calculation skills can be implemented, according to an example embodiment. The environment 100A may include an electronic abacus 110, a user 120, and a computing device 140.

The computing device 140 may include a television set, a personal computer (PC), a laptop, a smartphone, a tablet PC, a personal wearable device, and so forth. In certain embodiments, the computing device 140 may include a graphical display system 160. In some embodiments, the computing device 140 can be collocated in the same place (a room, a class, and so forth) with the electronic abacus 110.

In some embodiments, the electronic abacus can be configured to receive, for example from the computing device 140, at least one mathematical problem. The mathematical problem may include a sequence of mathematical operations. In certain embodiments, the sequence of mathematical operations can be displayed on graphical display system 160 to the user 120. In certain embodiments, the electronic abacus 110 may include an audio device for playing back an audio message. The message may include a spoken recording of a text including the mathematical problem(s).

The user 120 may operate the electronic abacus 110 to solve the mathematical problem by steps, with each step including a single mathematical operation. In some embodiments, the user 120 can be given a time interval to perform a single mathematical operation using the electronic abacus 110. In other embodiments, the electronic abacus 110 can be configured to wait until the user 120 moves the beads.

In some embodiments, the electronic abacus 110 can be configured to check whether the user correctly solves the mathematical problem at each step. In certain embodiments, the electronic abacus 110 can be configured to warn the user 120 if a step of a mathematical problem (a single mathematical operation) is solved incorrectly or a time for performing the operation is passed. In this case, in certain embodiments, the electronic abacus 110 may be configured to prompt the user 120 with which manipulations should be done to solve the step correctly. In some embodiments, the electronic abacus 110 can be configured to play a sound if the step of a mathematical problem is solved incorrectly. In other embodiments, the electronic abacus 110 can be configured to vibrate if the step of mathematical problem is solved incorrectly. In some embodiments, the electronic abacus 110 may be configured to use light indicators if the step of mathematical problem is solved incorrectly. Similarly, in some embodiments, the electronic abacus 110 may be configured to notify the user 120 that the step of the mathematical problem is solved correctly by playing a sound, vibrating, and/or lighting up the light indicators. Different sounds, different types of vibration, and different colors for the lighting the light indicators can be used for notifying that the step has been solved incorrectly and notifying that the step has been solved correctly.

In some embodiments, the electronic abacus 110 may be further configured to determine times which the user 120 spends to correctly perform mathematical operations of the mathematical problem(s) using the electronic abacus 110. In some embodiments, the electronic abacus 110 may be configured to store records of errors of the user 120 solving the mathematical problem(s) and times the user spent to solve the mathematical problem(s).

Figure 1B:
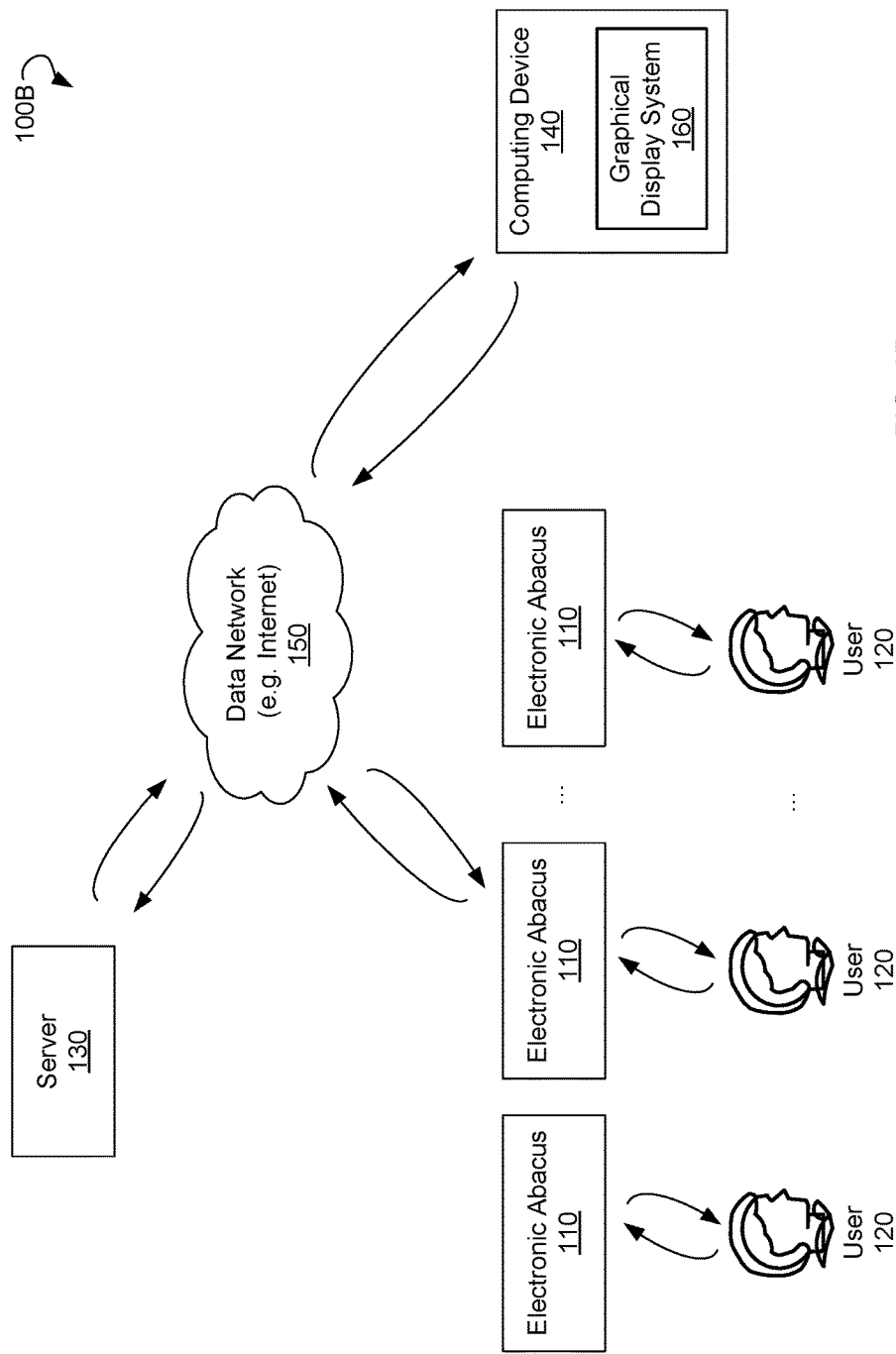
FIG. 1B shows an environment within which a system for teaching of calculation skills using an electronic abacus can be implemented, according to another example embodiment.

FIG. 1B illustrates an environment 100B within which a system for teaching calculation skills can be implemented, according to another example embodiment. The environment 100B may include one or more electronic abacus(es) 110, one or more user(s) 120, a server 130, a computing device 140, and a data network 150.

The data network 150 may include the Internet, a computing cloud, and any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, and the like. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking.

In various embodiments, the server 130 can include computing resources (hardware and software) available at a remote location and accessible over the data network 150. The server 130 can be communicatively coupled to one or multiple electronic abacus(es) 110 via the data network 150. In certain embodiments, each of the electronic abacus(es) 110 can be assigned individual identifier(s). The server 130 may be configured to receive the individual identifier(s) and differentiate the electronic abacus(es) 110 based on the individual identifier(s). The server 130 can be shared by multiple user(s) 120. In certain embodiments, the server 130 may include one or more server farms/clusters including a collection of computer servers that can be co-located with network switches and/or routers.

In some embodiments, the server 130 may be configured at least to store mathematical problem(s) for solving by the user(s) 120 using the electronic abacus(es) 110. The mathematical problem(s) may include one or more mathematical operations, wherein each of the mathematical operations includes an addition, subtraction, multiplication, or division of integer numbers. The mathematical problem(s) can be divided by themes and complexity levels.

In some embodiments, the server 130 can be further configured to send the mathematical problem(s) to the electronic abacus 110. The electronic abacus(es) can be configured to receive the mathematical problem(s) from the server 130. In some embodiments, the server 130 can be communicatively coupled to the computing device 140. The server 130 can be configured to determine that the electronic abacus(es) 110 and the computing device 140 are located within the same place based on parameters of the data network 150. For example, the server 130 can be configured to determine that the computing device 140 and the electronic abacus(es) 110 are connected to the data network 150 via the same Wi-Fi™ router.

In some embodiments, the server 130 can be further configured to send the mathematical problem(s) concurrently to one or more electronic abacus(es) 110 and the computing device 140. The computing device 140 can be further configured to present, by the graphical display system 160, the mathematical problem(s) currently being offered to be solved to the user(s) 120 using the electronic abacus(es) 110. In certain embodiments, the mathematical problem(s) can be displayed by a single mathematical operation per time. Each mathematical operation can be displayed for a pre-determined time.

The electronic abacus(es) 110 can be further configured to track and store times of solving mathematical problem(s) and errors of solving the mathematical problem(s). After finishing a teaching session (for example, after solving a set of mathematical problem(s)), the electronic abacus(es) 110 can be configured to send the information regarding the times of solving and errors of solving to the server 130.

In some embodiments, the server 130 may be further configured to store profile(s) of the user(s) 120. The profile(s) may include mathematical problem(s) the user(s) 120 solved with the electronic abacus 110, times the user(s) 120 spent on solving the mathematical problems, and errors the user(s) 120 made while solving the mathematical problem(s). The server 130 may be further configured to provide statistics on solving the mathematical problem(s) by different user(s) 120 to authorized users. For example, the user(s) 120 may review, using an application running on the server, the results of training, score(s) of training, and the user(s) standing in a table of scores of the user(s) 120.

FIG. 1C illustrates an environment 100C within which a system for teaching calculation skills can be implemented, according to yet another example embodiment. The environment 100C may include one or more electronic abacus(es) 110, one or more user(s) 120, a server 130, computing device(s) 140 with graphical system interface 160, and a data network 150, as described in FIG. 1C. In environment 100C, the one or more electronic abacus(es) 110, one or more users(s) 120, and computing device(s) 140 are divided in groups 190. The groups 190 can be located at different geographical locations. Prior to starting a teaching session including a set of mathematical problem(s), electronic abacus(es) 110 and computing devices 140 can be configured to be registered and synchronized with the server 130. During solving the mathematical problem(s), the computing device(s) 140 can be further configured to display a world time and the mathematical problem(s) for all groups 190. In some embodiments, the users of groups 190 can solve the mathematical problem(s) within the same time period. In other embodiments, the users of different groups 120 can solve the mathematical problem(s) independently of each other during different time periods.

Figure 2:
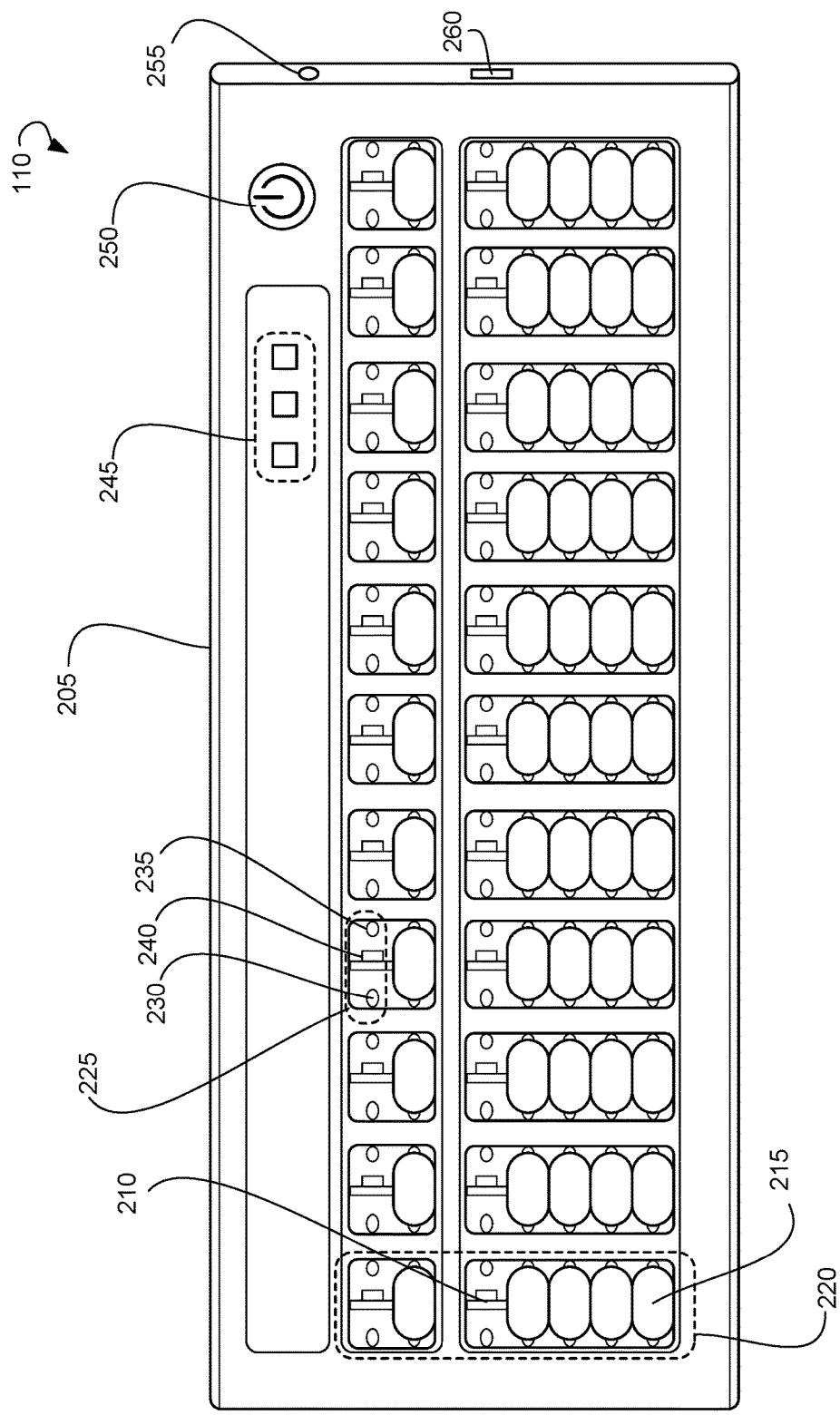
FIG. 2 is a front right view of an electronic abacus, according to some example embodiments.

FIG. 2 is a top view of an example electronic abacus 110, according to some example embodiments. The electronic abacus 110 may include a body 205, rods 210, and beads 215. The shape of the body 205 may include troughs for placement of the rods 210 and beads 215. The beads 215 can be divided in columns 220. The beads 215 may be allowed to be movable along the rods 210 to occupy cells 225.

In example of FIG. 2, each of the columns 220 includes 7 cells, which are further divided in two sections. The first section includes 2 cells that can be occupied by one of the beads 215. The second section includes five cells that can be occupied by four of the beads 215. It should be noted, that technology for teaching calculations skills described herein can be also used for abacuses with other configurations of columns, cells, and beads.

Figure 3:
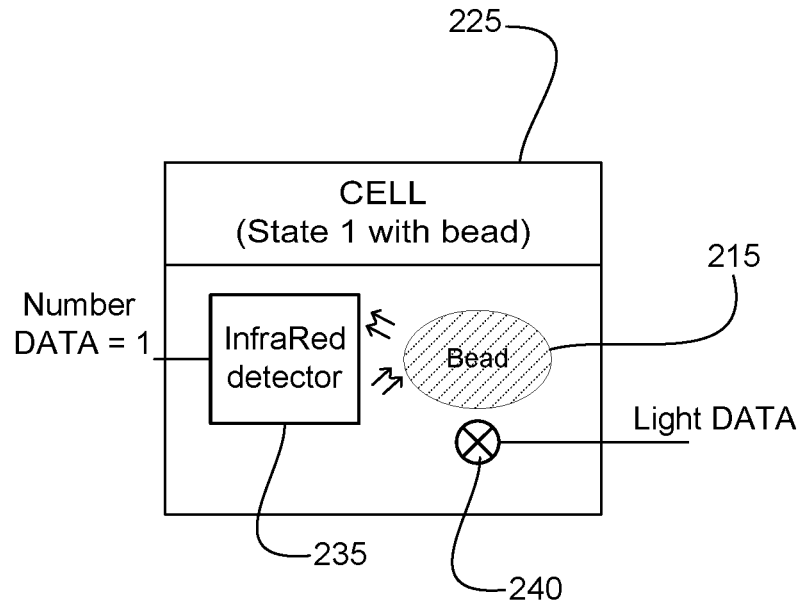
FIG. 3 is schematic showing states of a cell of an electronic abacus, according to some example embodiments.
Figure 3:
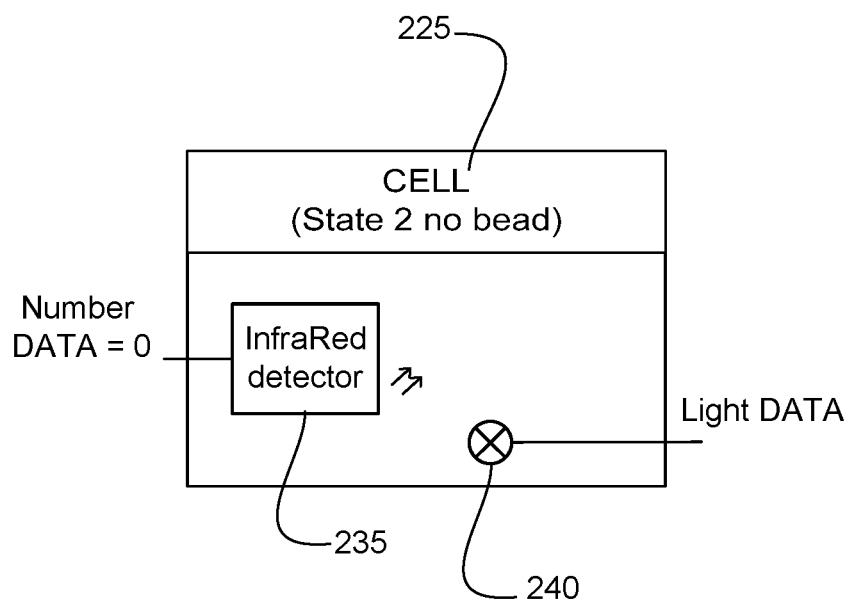

Each of the cells 225 may include a sensor for detecting if a bead 215 occupies a cell 225. In some embodiments, the sensor may include an infrared (IR) detector 235, and the cells 225 may also include (IR) light-emitting diode (LED) 230. As shown in FIG. 3, the IR detector 235 can be used to detect if a bead 215 occupies a cell 225. When the IR detector senses IR light reflected from the bead 215, the cell can be assigned with value 1. When the IR detector 235 does not sense IR light reflected from a bead, the cell 225 can be assigned with value 0.

Referring back to FIG. 2, in some embodiments, each of the cells 225 may further include light source unit 240 (for example, an LED). The light source unit may be configured to light one or more colors based on light data. The colors may include at least a green color and a red color.

In some embodiments, the electronic abacus 110 may further include LED indicators 245, a power button 250, power connector 255, and a universal serial bus (USB) port 260. The electronic abacus 110 may include additional or other components, for example, speakers, an audio output port, and a vibration device.

Figure 4:
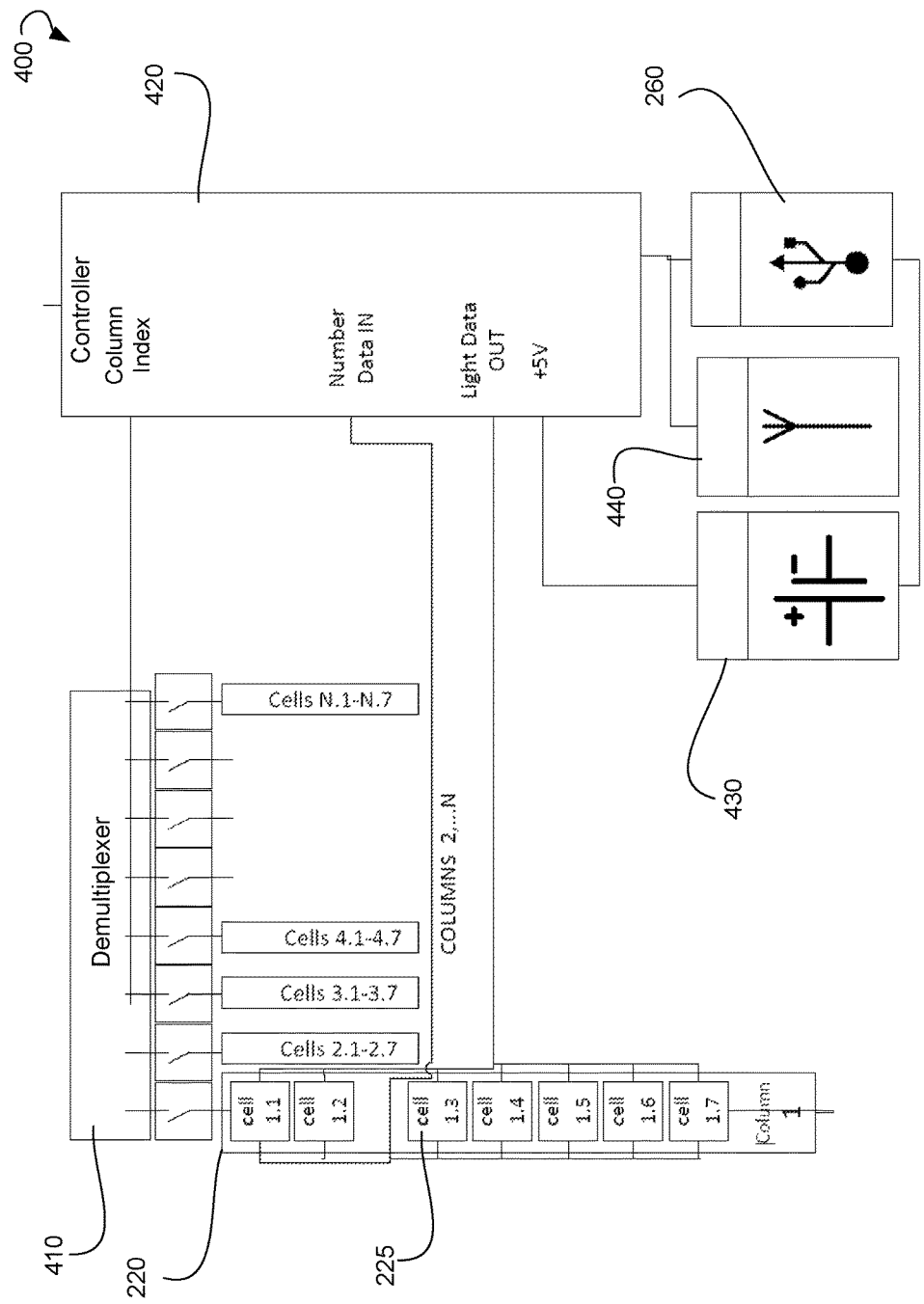
FIG. 4 shows a simplified electronic scheme of an electronic abacus, according to an example embodiment.

FIG. 4 is a simplified scheme of an electronic board 400 of the electronic abacus 110, according to an example embodiment. The electronic board 400 may include a demultiplexer 410, a controller 420, a rechargeable battery 430, a wireless communication unit 440, and an USB port 260.

In certain embodiments, the controller 420 may be implemented as a hardware utilizing either a combination of microprocessor(s), specially designed application-specific integrated circuits (ASICs), programmable logic devices, or system on chip (SoC) configured to run an operation system and various applications of electronic abacus 110. In some embodiments, the controller 420 may include a storage medium to store application data and instructions to be executable by the microprocessor(s).

The demultiplexer 410 can be configured to select one of the N columns 220, so the controller 420 may be configured to read the data from IR detectors 235 and set light data for light source units 240 in cells of the selected column.

In some embodiments, the USB port 260 can be used to program the controller 420. In certain embodiments, the controller 420 can be configured to receive data from the server 130 via the wireless communication unit 420.

In some embodiments, the controller 420 can be further configured to receive, via the wireless communication unit 440, an array of integer numbers X{i}, i=1-M. The controller 420 can be further configured to select a number X from the array X{i}, i=1-M. The number X may represent a correct intermediate result after performing a current mathematical operation of a mathematical problem currently offered to the user 120. The controller 420 may be configured to use number X to check if the current operation is performed correctly after the user 120 moves the beads. In some embodiments, the controller 420 may be configured to wait for a time interval within which the user 120 is allowed to move beads of the electronic abacus to perform the current mathematical operation of the mathematical problem. In certain embodiments, the time interval can also be received by the controller 420 from the server 130.

The controller 420 can be further configured to read the data from a sensor (for example, IR detectors 235 of cells 225 of columns 220, starting from the first column and ending with last column N). The data from IR detectors from cells 225 of the columns 220 represent binary numbers. The controller 420 can be further configured to convert the binary numbers to an integer number Y of length N. The integer number Y may represent an answer to the current mathematical operation of the mathematical problem(s). The controller 420 can be further configured to compare the integer number Y to number X. If the number Y is equal to number X, then the controller 420 can be configured to determine that the answer is right. If the number Y is not equal to number X, then the controller 420 can be configured to determine that the answer is wrong.

In some embodiments, if the answer is wrong, the controller 420 can be further configured to determine a first set of cells, wherein the beads are to be located for the right answer. The controller 420 may be further configured to light the light source units 240 of the first set of cells. For example, the light source units 240 of the first set of cells can be configured to light with a green color by setting appropriate light data.

In some embodiments, the controller 420 can be further configured to determine a second set of cells, which are incorrectly occupied with the beads, so these beads should be moved out of the cells of the second set to get the right answer. The controller 420 may be further configured to light the light source units 240 of cells in the second set. In some embodiments, these light source units can be configured to light with a right color by setting appropriate light data. The controller 420 can be further configured to wait until the user 120 moves the beads. The controller 420 can be further configured to check the answer and light the proper light source units in cells until the user 120 moves the beads to the cells that should be occupied to receive the right answer.

Figure 5:
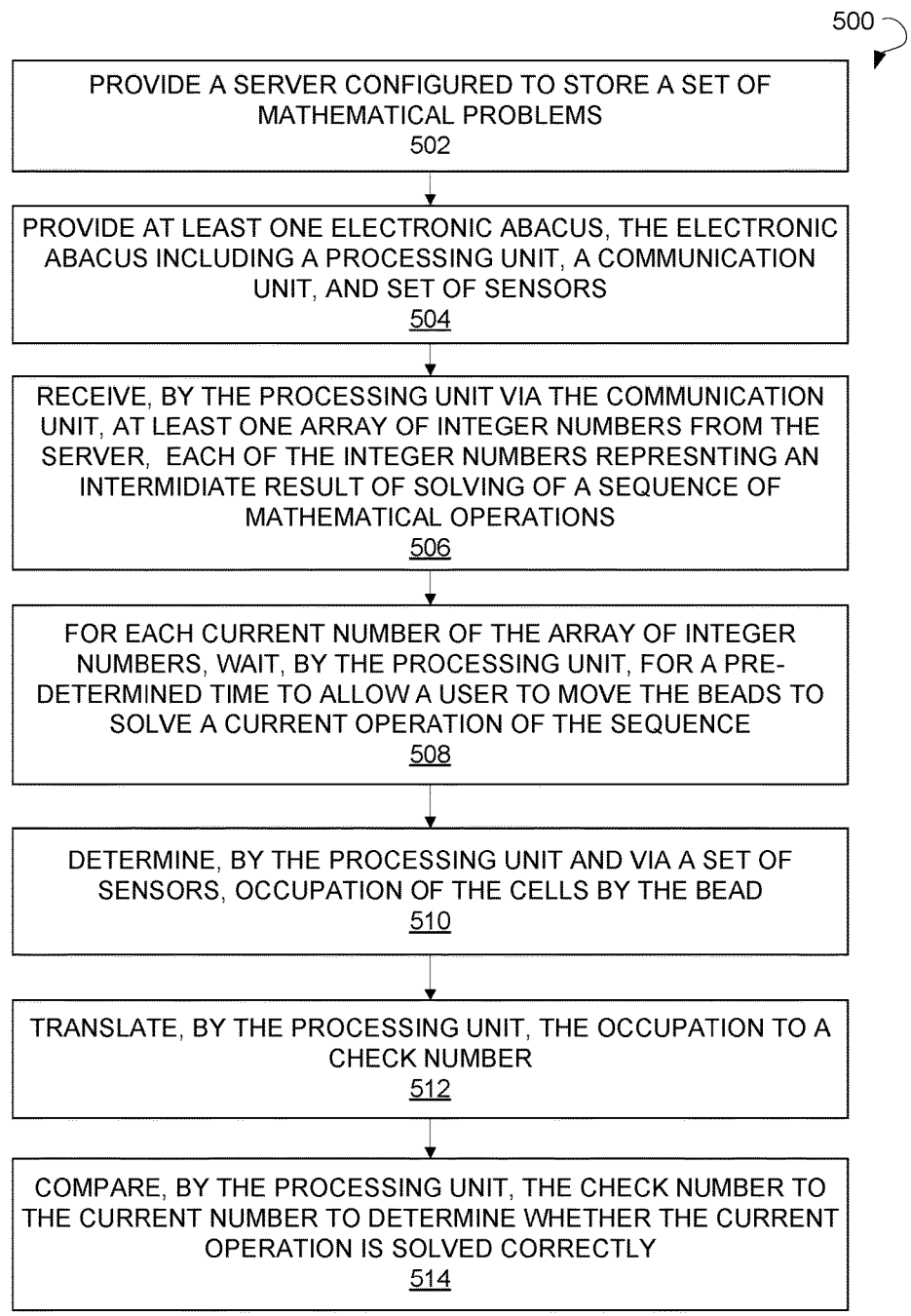
FIGS. 5-6 are flow charts showing steps of a method for teaching of calculation skills using an electronic abacus, according to an example embodiment.

FIG. 5 is a flow chart illustrating a method 500 for teaching calculation skills using an electronic abacus, in accordance with certain example embodiments of the present disclosure. The method 500 can be implemented in environment 100B shown in FIG. 1B.

The method 500 may commence in block 502 with providing a server configured at least to store a set of mathematical problems. Each mathematical problem may include a sequence of mathematical operations of addition, subtraction, multiplication, and division. The mathematical problems can be divided in themes by complexity levels.

In block 504, the method 500 may include providing at least one electronic abacus. The at least one electronic abacus may include a plurality of beads. The electronic abacus may further include a set of columns, with each of the columns including a predetermined number of cells. Each of the cells can be configured to be occupied by one of the beads. The electronic abacus may further include a communication unit for communicating with the server via a data network. The electronic abacus may further include a set of sensors configured to determine occupation of the cells by the beads. The electronic abacus may further include a set of light source units, with each of the light source unit being located within one of the cells. The electronic abacus may further include a processing unit electronically coupled to the set of sensors and the set of light source units.

In block 506, the method 500 may include receiving, by the processing unit via the communication unit, at least one array of integer numbers. Each integer of integer numbers represents an intermediate result of solving a sequence of mathematical operations. For example, the sequence "4," "+5," "+1," and "−3" can be represented by an array {4, 9, 10, 7}. The sequence of mathematical operations can be concurrently displayed to a user of the electronic abacus. For a current number of the array of integer numbers, starting from the first, operations in blocks 508-514 of the method 500 can be performed.

In block 508, the method 500 may include waiting, by the processing unit, for a pre-determined time interval to allow the user to move the beads to solve the current operation from the sequence of the mathematical operations.

In block 510, the method may include 500 determining, by the processing unit and via the set of sensors, occupation of the cells by the beads.

In block 512, the method 500 may include translating, by the processing unit, the occupation of cells to a check number.

In block 514, the method may include comparing, by the processing unit, the check number to the current number in the array to determine whether the current operation is solved correctly.

Figure 6:
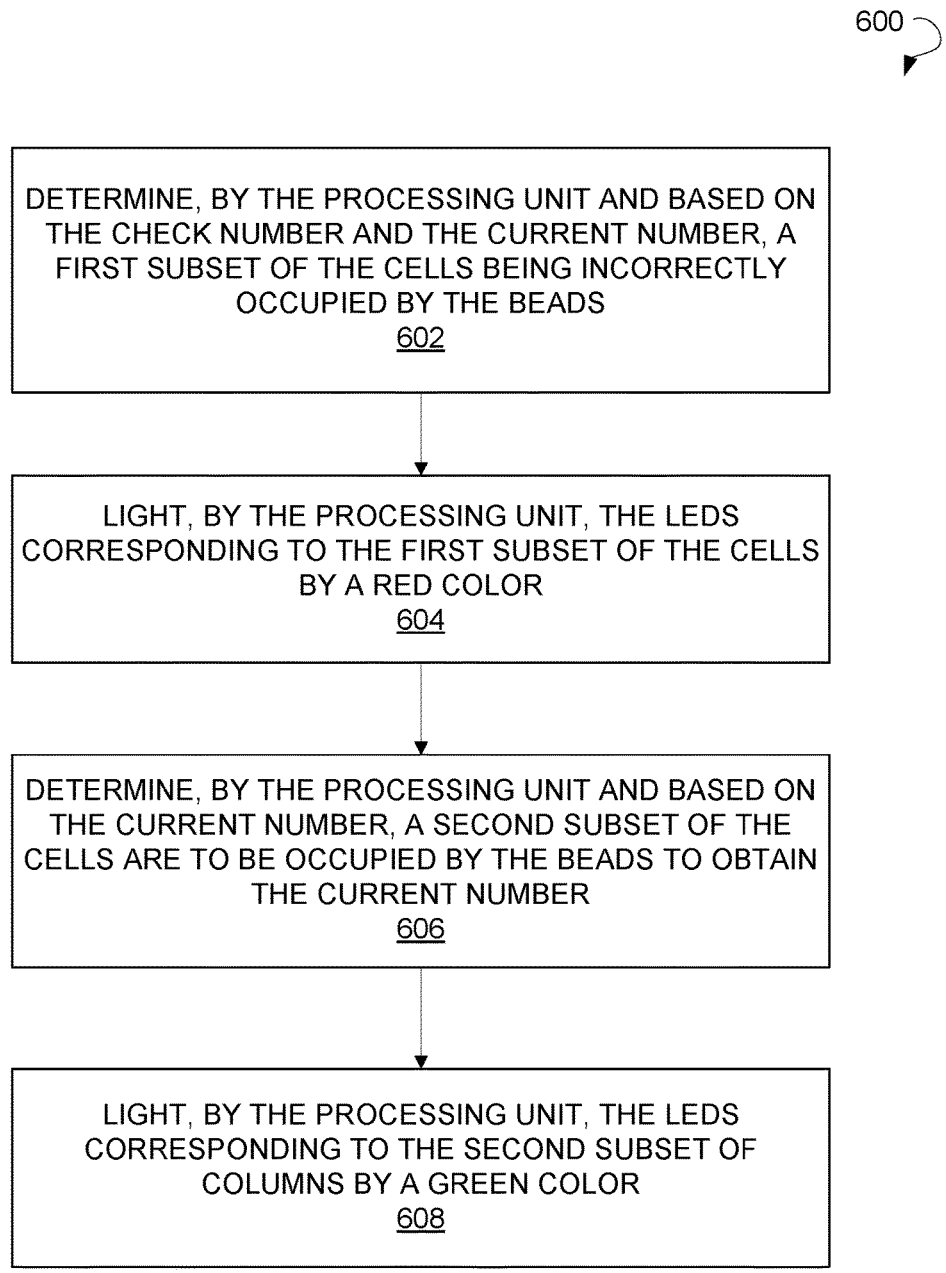

FIG. 6 is a flow chart illustrating a method 600 for training calculations skills using an electronic abacus, in accordance with certain embodiments. The method 600 may provide additional steps of the method 500 of FIG. 5.

In block 602, the method 600 may include determining, by the processing unit of the electronic abacus and based on the check number and the current number, a first subset of the cells being incorrectly occupied by the beads.

In block 604, the method 600 may include lighting, by the processing unit of the electronic abacus, the light source units corresponding to the first subset of the cells (for example, by a red color).

In block 606, the method 600 may include determining, by the processing unit of the electronic abacus and based on the current number, a second subset of the cells are to be occupied by the beads to obtain the current number.

In block 608, the method 600 may include lighting, by the processing unit, the light source units corresponding to the second subset of cells (for example, by a green color).

Figure 7:
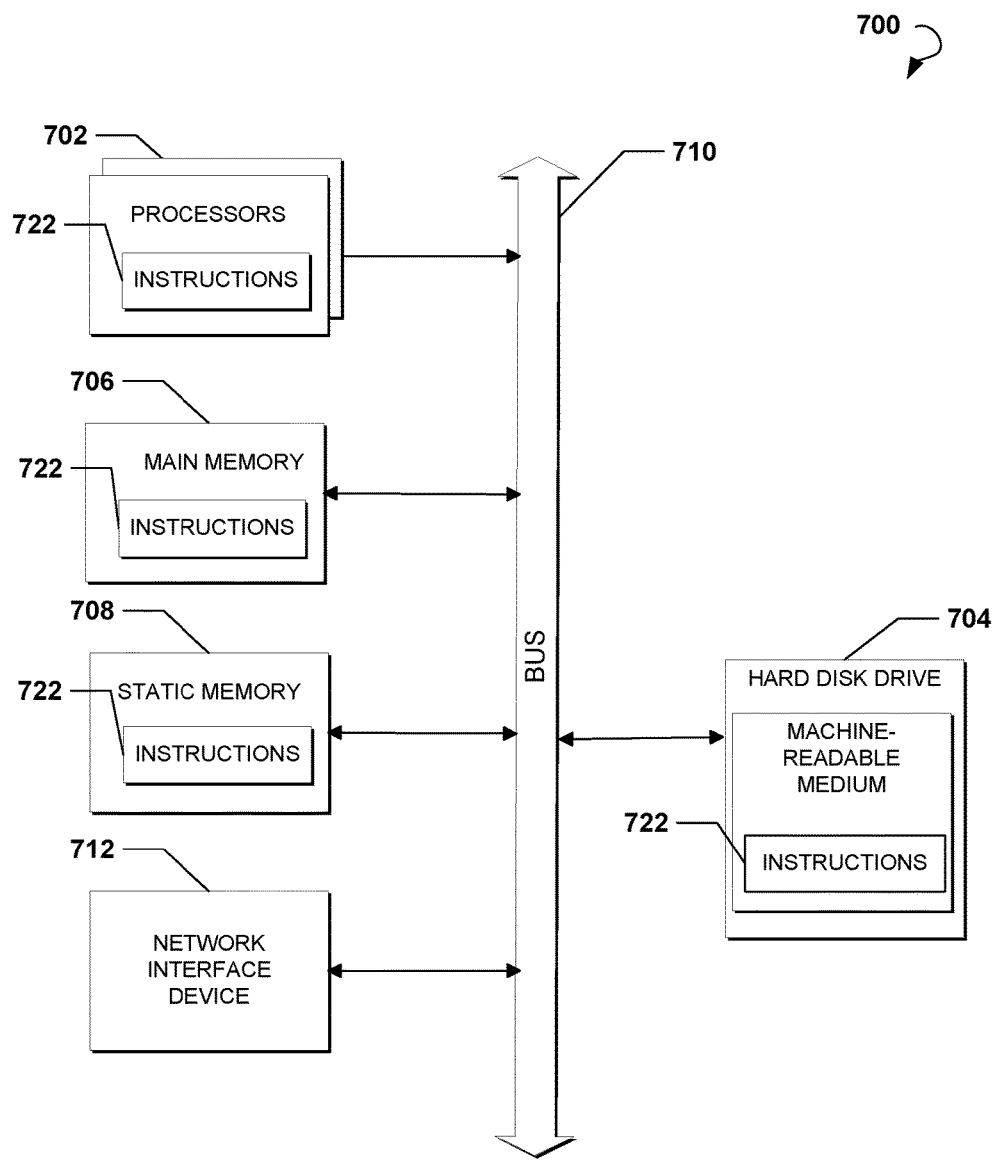
FIG. 7 shows a diagrammatic representation of a computing device for a machine, within which a set of instructions for causing the machine to perform any one or more of the methodologies discussed herein, can be executed.

FIG. 7 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 may include a processor or multiple processors 702, a hard disk drive 704, a main memory 706, and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or within the processors 702 during execution thereof by the computer system 700. The main memory 706 and the processors 702 also constitute machine-readable media.

While the computer-readable medium 720 is shown in an exemplary embodiment to be a single medium, the term "computer-readable medium" should be taken to include single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, Read-Only Memory, and the like.

The example embodiments described herein may be implemented in an operating environment comprising software installed on a computer, in hardware, or in a combination of software and hardware.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, apparatus and system for teaching calculations skills have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. An apparatus for teaching calculation skills, the apparatus comprising:
   a plurality of beads;
   a set of columns, each of the columns including a predetermined number of cells, each of the cells being configured to be occupied by one of the beads;
   a communication unit for communicating with a server;
   a set of sensors configured to determine occupation of the cells by the beads;
   a set of light source units, each of the light source units located within one of the cells; and
   a processing unit electronically coupled to the set of sensors and the set of the light source units, the processing unit configured to:
      receive, via the communication unit from the server, at least one array of integer numbers, each of the integer numbers representing an intermediate result of solving of a sequence of mathematical operations, the sequence of mathematical operations being displayed to a user; and
      for each current number of the at least one array of integer numbers:
         wait for a pre-determined time to allow the user to move the beads to solve a current operation from the sequence of mathematical operations;
         determine, via the set of sensors, occupation of the cells by the beads;
         translate the occupation of cells into a check number;
         compare the check number to the current number to determine whether the current operation is solved correctly;
         determine, based on the check number and the current number, a first subset of the cells being incorrectly occupied by the beads; and
         light, with a first color, the light source units corresponding to the first subset of the cells.

2. The apparatus of claim 1, wherein the sensors are infrared detectors, each of the infrared detectors being located within one of the cells.

3. The apparatus of claim 1, wherein the communication unit is a wireless communication unit.

4. The apparatus of claim 1, wherein the beads are made from a semitransparent material.

5. The apparatus of claim 1, wherein the light source units are light-emitting diodes.

6. The apparatus of claim 1, wherein the first color is red.

7. The apparatus of claim 1, wherein the processing unit is further configured to:
   determine, based on the current number, a second subset of the cells to be occupied by the beads to obtain the current number; and
   light, with a second color, the light source units corresponding to the second subset of columns.

8. The apparatus of claim 7, wherein the second color is green.

9. The apparatus of claim 1, wherein the processing unit is further configured to receive, via the communication unit, the pre-determined time from the server.

10. A system for teaching calculation skills, the system comprising:
    a server configured at least to store a set of mathematical problems;
    at least one electronic abacus, the at least one electronic abacus comprising:
       a plurality of beads;
       a set of columns, each of the columns including a predetermined number of cells, each of the cells being configured to be occupied by only one of the beads;
       a communication unit for communicating with the sever via a data network;
       a set of sensors configured to determine occupation of the cells by the beads;
       a set of light source units, each of the light source units located within one of the cells; and
       a processing unit electronically coupled to the set of sensors and the set of the light source units, the processing unit being configured to:
          receive, via the communication unit from the server, at least one array of integer numbers, each of the integer numbers representing an intermediate result of solving of a sequence of mathematical operations, the sequence of the mathematical operations representing one of the mathematical problems, the sequence of mathematical operations being displayed to a user; and
          for each current number of the at least one array of integer numbers:
             wait for a pre-determined time to allow the user to move the beads to solve a current operation from the sequence of mathematical operations;
             determine, via the set of sensors, occupation of the cells by the beads;
             translate the occupation of cells into a check number;
             compare the check number to the current number to determine whether the current operation is solved correctly;
             determine, based on the check number and the current number, a first subset of the cells being incorrectly occupied by the beads; and
             light the light source units corresponding to the first subset of the cells.

11. The system of claim 10, wherein prior to receiving at least one array of integer numbers the processing unit is further configured to:
    send, via the communication unit, a registration message to the server, the registration message including at least an identifier of the at least one electronic abacus; and
    synchronize, via the communication unit, time associated with the at least one electronic abacus with a time of server.

12. The system of claim 10, wherein the processing unit is further configured to:
    track and store errors and times of solving of a sequence of mathematical operations; and
    send, via the communication unit, the errors and times of solving of the at least one of the mathematical problems to the server.

13. A system for teaching calculation skills, the system comprising:
    a server configured at least to store a set of mathematical problems;
    at least one electronic abacus for solving the mathematical problems, the at least one electronic abacus comprising:
       a plurality of beads;
       a set of columns, each of the columns including a predetermined number of cells, each of the cells being configured to be occupied by one of the beads;
       a communication unit for communicating with the sever via a data network;
       a set of sensors configured to determine occupation of the cells by the beads;
       a set of light source units, each of the light source units located within one of the cells; and
       a processing unit electronically coupled to the set of sensors and the set of the light source units, the processing unit being configured to:
          receive, via the communication unit from the server, at least one array of integer numbers, each of the integer numbers representing an intermediate result of solving of a sequence of mathematical operations, the sequence of the mathematical operations representing one of the mathematical problems, the sequence of mathematical operations being displayed to a user; and
          for each current number of the at least one array of integer numbers:
             wait for a pre-determined time to allow the user to move the beads to solve a current operation from the sequence of mathematical operations;
             determine, via the set of sensors, occupation of the cells by the beads;
             translate the occupation of cells into a check number;
             compare the check number to the current number to determine whether the current operation is solved correctly;
             determine, based on the check number and the current number, a first subset of the cells being incorrectly occupied by the beads; and
             light, with a first color, the light source units corresponding to the first subset of the cells; and
    a computing device, the computing device including at least a graphical display system and a device communication unit for communicating with the server via the data network, the computing device being configured to:
       receive, via the device communication unit, the sequence of the mathematical operations representing one of the mathematical problems; and
       display, via the graphical display system, the sequence of the mathematical operations.

14. The system of claim 13, wherein the processing unit is further configured to:
- determine, based on the current number, a second subset of the cells to be occupied by the beads to obtain the current number; and
- light, with a second color, the light source units corresponding to the second subset of columns.

15. The system of claim 13, wherein prior to receiving at least one array of integer numbers the processing unit is further configured to:
- send, via the communication unit, a registration message to the server, the registration message including at least an identifier of the at least one electronic abacus;
- synchronize, via the communication unit, time associated with the at least one electronic abacus with time of a server; and
- the computing device is further configured to:
  - send, via the device communication unit, a further registration message to the server; and
  - synchronize, via the device computing device, a time associated with the computing device with the time of server.

16. The system of claim 13, wherein the processing unit is further configured to:
- track and store errors and times of solving of a sequence of mathematical operations; and
- send, via the communication unit, the errors and times of solving of the at least one of the mathematical problems to the server.

* * * * *

UNITED STATES PATENT AND TRADEMARK OFFICE
CERTIFICATE OF CORRECTION

PATENT NO. : 10,168,729 B1
APPLICATION NO. : 15/821792
DATED : January 1, 2019
INVENTOR(S) : Novosolov et al.

Page 1 of 1

It is certified that error appears in the above-identified patent and that said Letters Patent is hereby corrected as shown below:

On the Title Page

At Item (72), Inventors:
On Line 3, after (UA) add the name Oleksandr Shafir, Dnipro (UA)

Signed and Sealed this
Fourteenth Day of May, 2019

Andrei Iancu
*Director of the United States Patent and Trademark Office*